3,105,739
METHOD FOR PRODUCING ALUMINA FREE FROM ALKALINE EARTH METAL IMPURITIES
John C. Hayes, Palatine, Ill., assignor to Universal Oil Products Company, Des Plaines, Ill., a corporation of Delaware
No Drawing. Filed Jan. 18, 1962, Ser. No. 167,187
9 Claims. (Cl. 23—143)

The present invention relates to the manufacture of alumina, and is particularly directed toward the preparation of alumina from impurity-containing aluminum salts. More specifically, the present invention affords a method for improving the purity of alumina prepared from aluminum salts containing at least one impurity selected from the group of alkaline-earth metals.

Alumina, as aluminum oxide hydrate, or as aluminum hydroxide, is widely used throughout the chemical and petroleum industries. It is often employed as a dehydrating, treating or purifying agent, or as a catalyst in and of itself. Alumina is most often utilized, however, as the carrier material for a wide variety of catalytically active metallic components in the manufacture of a multitude of conversion and/or treating catalysts. Many investigations have been conducted with respect to manufacturing procedures for the purpose of producing relatively inexpensive, high-purity alumina. Precipitation methods have been studied whereby a weak alkaline material, such as an aqueous solution of ammonium hydroxide, is added to a solution of a suitable aluminum salt to form a precipitate of alumina. The "oil-drop" method, as described in U.S. Patent No. 2,620,314, issued to James Hoekstra, was developed for the purpose of producing alumina particles having a spherical shape. Briefly, in the oil-drop method, an aluminum salt solution, or hydrosol, is formed, commingled with a suitable gelling agent, the mixture being passed into a hot oil bath wherein gelation thereof is effected to form alumina hydrogel particles. Whether by precipitation methods, or the oil-drop method, the alumina hydrogel particles are subsequently dried and calcined at an elevated temperature to form the finished alumina.

Regardless of the use for which the finished alumina product is intended, the same must generally possess a high degree of purity. For this reason, a great majority of the methods of manufacturing alumina utilize metallic aluminum of virtually 100% purity as the initial source thereof. This is particularly true when the finished alumina is intended for utilization as the carrier material for catalytically active metallic components. The composition of a catalyst is generally such that the active metallic components are present in minor quantities compared to the quantity of the alumina employed as the carrier. For example, active metallic components selected from groups VI–B and VIII of the periodic table are generally present in amounts ranging from about 0.01% to about 20.0% by weight of the total composite. Thus, even minute quantities of metallic impurities, in particular instances as low as about 0.0002% by weight (2.0 p.p.m.), have the tendency to inhibit or otherwise detrimentally affect the desired catalytic action. Notwithstanding that some uses of alumina do not require the high degree of purity attendant the catalytic use thereof, the presence of impurities from the group of alkali and alkaline-earth metals tends to affect detrimentally the intended, desired result.

Alumina, for utilization as a catalyst or carrier material, is usually prepared, as hereinabove set forth, by precipitation from an aluminum salt solution, or via the gelation of an aluminum-containing hydrosol, for example, aluminum chloride, sulfate, nitrate, carbonate, mixtures thereof, etc. Such solutions or sols invariably contain ionic metallic contaminants in varying degrees. The purity of the alumina produced is dependent upon the success achieved in preventing the co-precipitation, or co-gelation of the undesired contaminants along with the alumina. Some metallic contaminants are readily removed by relatively simple processing techniques; on the other hand, many contaminating metals, often present in detrimental quantities, are not as readily removed and often appear in the finished product. This is especially true of the alkaline-earth metals including beryllium, magnesium, calcium, strontium, and barium. Of the alkaline-earth metals, magnesium and calcium are generally present as contaminating influences more often, and in greater concentrations than beryllium, strontium and/or barium. For example, magnesium and calcium are generally found in the aluminum sulfate resulting in abundant quantities from processes designed to recover catalytically active metallic components from an alumina composite thereof through the utilization of sulfuric acid.

The primary object of the present inventon is to provide a method for manufacturing alumina utilizing aluminum salts containing metallic impurities from the group of alkaline-earth metals and compounds thereof. As hereinafter indicated, the present invention is specifically directed toward the use of aluminum salts containing ionic, detrimental quantities of calcium and magnesium.

In a broad embodiment, the present invention relates to a method of preparing alumina from an aluminum salt containing an impurity from the group of alkaline-earth metals which comprises contacting an alumina hydrogel, formed from said aluminum salt, with a di-carboxylic acid containing from about 2 to about 7 carbon atoms per molecule, separating said hydrogel from the resulting mixture and thereafter calcining the hydrogel to form alumina substantially free from alkaline-earth and compounds thereof.

Another broad embodiment of the present invention inolves a method of preparing alumina from an aluminum salt containing an impurity from the group of alkaline-earth metals which comprises commingling said aluminum salt with a di-carboxylic acid containing from about 2 to about 7 carbon atoms per molecule, forming an alumina hydrogel from the resulting mixture, and thereafter calcining said hydrogel to form alumina substantially free from alkaline-earth metals and compounds thereof.

A specific embodiment of the present invention encompasses a method of preparing alumina from a solution of an aluminum salt containing an impurity from the group of alkaline-earth metals which comprises commingling said solution with at least one mol of a di-carboxylic acid, containing from about 2 to about 7 carbon atoms per molecule, per mol of alkaline-earth metal, forming an alumina hydrogel from the resulting mixture, and thereafter calcining said hydrogel to form alumina substantially free from alkaline-earth metals and compounds thereof.

A more limited embodiment of the present invention relates to a method of preparing alumina from a solution of an aluminum salt containing an impurity from the group of calcium, magnesium and mixtures thereof which comprises commingling said solution with at least one mol of a di-carboxylic acid, containing from about 2 to about 7 carbon atoms per molecule, per mol of said impurity, forming an alumina hydrogel from the resulting mixture at an acidic pH greater than about 4.5, and thereafter calcining said hydrogel to form alumina substantially free from calcium, magnesium and compounds thereof.

As hereinbefore stated, aluminum salts, to be utilized in the preparation of alumina, generally contain ionic quantities of alkaline-earth metals, particularly calcium and/or magnesium, which exert a detrimental effect when present in the final product. In the case of certain ions, the co-precipitation thereof with the alumina is easily prevented by removing the undesired ions from the solution prior to precipitation or gelation. For example, metallic ions of copper, lead, zinc, iron, chromium, cobalt, molybdenum and nickel are readily removed from aluminum salt solutions and hydrosols by electrolytic precipitation, employing a mercury cathode electrolytic cell. In the case of alkali metal ions, such as sodium and/or potassium, electrolytic precipitation is less feasible because of the low electron affinity of sodium and/or potassium. These ions are, however, easily removed after precipitation of the alumina due to the high degree of solubility of the hydroxides thereof. The removal is effected by thorough washing of the precipitated or gelled alumina, prior to drying and high-temperature calcination to form the final alumina product.

With respect to the alkaline-earth metals, and particularly magnesium and calcium, the metal ions are not readily reducible at a mercury cathode, and electrolytic precipitation is not, therefore, effective as a purifying technique. Furthermore, the high degree of insolubility of the alkaline-earth hydroxides makes their removal by a simple washing of the precipitated alumina virtually ineffective. The result is, therefore, that none of the usual methods for purifying an aluminum salt solution or hydrosol, or the precipitates obtained therefrom, is effective in lowering the contamination level represented by the alkaline-earth ions, particularly calcium and magnesium.

Through the utilization of the method of the present invention, the undesirable situation arising as a result of the presence of alkaline-earth metallic ions is alleviated by forming soluble complexes of these ions at an appropriate stage in the precipitation or gelation process so that they may be, as are the alkali metal ions, washed out of the precipitated or gelled alumina, prior to drying and/or calcination, or are not caused to precipitate along with the alumina hydrogel. In accordance with the method of the present invention, the soluble complex of the alkaline-earth metal ion, for example magnesium, is formed by commingling a di-carboxylic acid, containing from about 2 to about 7 carbon atoms per molecule, with the alumina hydrogel. It is understood that the hydrogel may be contacted with the di-carboxylic acid after the same has been formed, and prior to the high-temperature calcination procedure, or the di-carboxylic acid may be commingled with the aluminum salt solution prior to effecting the precipitation of the alumina hydrogel. The di-carboxylic acid may be saturated or unsaturated, having from about 2 to about 7 carbon atoms per molecule. Di-carboxylic acids containing more than about 7 carbon atoms per molecule do not readily form an easily removable soluble complex with the magnesium and calcium ions. Therefore, suitable di-carboxylic acids include, but not by way of limitation, oxalic acid, malonic acid, succinic acid, glutaric acid, adipic acid, pimelic acid, maleic acid, citraconic acid, itaconic acid, etc.

The di-carboxylic acid is preferably added to the aluminum salt solution prior to forming the alumina hydrogel therefrom. The amount of the di-carboxylic acid commingled with the aluminum salt solution is determined by the quantity of contaminating metallic ions present therein. At least one mole of the acid is employed per mol of metallic ion present. In those situations where the alumina hydrogel is initially formed in the absence of the di-carboxylic acid, to be subsequently contacted therewith, the washing solution may contain up to about 5 mols of the di-carboxylic acid per mol of metallic ion present. During precipitation or gelation in the presence of the di-carboxylic acid, the precipitating mixture should be at a pH of about 4.5 to about 7.0, and preferably from about 4.5 to about 5.5. At an acidic pH level within the foregoing range, it is possible to form the soluble complexes of alkaline-earth ions more readily due to the favorable ratio of free calcium and magnesium ions to free aluminum ions. In any event, the complexes thus formed will remain stable and soluble during the completion of the precipitation or gelation and are readily removed from the precipitate by washing-filtering techniques prior to the drying and/or calcination thereof.

The following example is given for the purpose of illustrating the method of effecting the present invention. It is not intended to limit the present invention to the reagents, concentrations, and/or conditions employed within the example.

*Example*

An aqueous solution of aluminum sulfate, having a specific gravity of about 1.28, and prepared from the aluminum sulfate resulting from a sulfuric acid digestion of an alumina-platinum composite, is commingled with maleic acid in an amount to yield a 1.1 mol ratio of maleic acid to alkaline-earth metal ions present in the aluminum sulfate solution. A typical analysis of the aluminum sulfate recovered from a platinum-recovery process indicates the presence therein of about 0.005% by weight (50.0 p.p.m.) of magnesium and about 0.005% by weight of calcium. These quantities of calcium and magnesium, if allowed to remain within the aluminum sulfate solution, would, under normal circumstances, appear in the alumina hydrogel which is precipitated therefrom. When such alumina is employed as the carrier material for catalytically active metallic components, the calcium and magnesium ions affect detrimentally the use for which the catalytic composite is intended.

The mixture of aluminum sulfate and maleic acid is commingled with ammonium hydroxide, the two solutions being added simultaneously to a suitable vessel. The resulting reaction mixture is maintained at a pH level of from about 4.5 to about 7.0. When the desired quantity of alumina hydrogel is precipitated, the addition of the ammonium hydroxide and aluminum sulfate-maleic acid solutions is ceased. An alumina hydrogel filter cake is recovered by a simple washing-filtering process in which soluble alkali metal hydroxides are readily removed, and the soluble calcium and magnesium complexes are washed from the precipitate. The final filter cake is dried for a period of from about 2 to about 12 hours at a temperature of about 200° F., and thereafter calcined at a temperature of from about 800° to about 1400° F., and for a period of from about 2 to about 12 hours. The calcined alumina is ground to a talc-like powder, and formed into particles of any desired size and/or shape. An analysis of the calcined alumina particles indicates the presence of less than about 0.0001% by weight (1.0 p.p.m.) of magnesium and calcium.

The foregoing example and specification indicate the method by which impurity-containing aluminum salts may be utilized in the formation of a substantially pure alumina. The benefits afforded through the utilization of the method of the present invention will be readily recognized by those possessing skill within the art of catalysis, and having knowledge of the detrimental effects exhibited by the presence of alkaline-earth metal ions if permitted to be present in the final alumina product intended for utilization as the catalytic carrier material.

I claim as my invention:

1. A method for the preparation of alumina from an aluminum salt containing an ionic alkaline earth metal impurity which comprises subjecting a solution of said salt to gelation at an acidic pH of from about 4.5 to about 7.0 to form an alumina hydrogel, contacting said hydrogel with a di-carboxylic acid containing from about 2 to about 7 carbon atoms per molecule and capable of forming a soluble complex with the alkaline earth metal ions, said acid being in an amount of at least one mol of acid per mol of alkaline earth metal ion, washing the resultant soluble complex out of the hydrogel and thereafter calcining the hydrogel to form an alumina substantially free of alkaline earth metal impurity.

2. The method of claim 1 further characterized in that said acid is added to the aluminum salt solution prior to the gelation of the latter.

3. A method for the preparation of alumina from a solution of an aluminum salt containing an ionic alkaline earth metal impurity which comprises commingling with said solution a di-carboxylic acid containing from about 2 to about 7 carbon atoms per molecule and capable of forming a soluble complex with the alkaline earth metal ions, said acid being in an amount of at least one mol of acid per mol of alkaline earth metal ion, gelling the resultant mixture at an acidic pH of from about 4.5 to about 7.0, thereby forming an alumina hydrogel containing the alkaline earth metal ions in the form of a soluble complex with said acid, washing the hydrogel to remove said complex therefrom, and calcining the washed hydrogel to produce an alumina substantially free of alkaline earth metal impurity.

4. The metohd of claim 3 further characterized in that said di-carboxylic acid is malonic acid.

5. The method of claim 3 further characterized in that said di-carboxylic acid is maleic acid.

6. The method of claim 3 further characterized in that said di-carboxylic acid is adipic acid.

7. The method of claim 3 further characterized in that said di-carboxylic acid is itaconic acid.

8. The method of claim 3 further characterized in that said di-carboxylic acid is succinic acid.

9. A method for the preparation of alumina from an aluminum salt solution containing calcium and magnesium ions which comprises commingling with said solution at least one mol of maleic acid per mol of calcium and magnesium present in the solution, gelling the resultant mixture at a pH of from about 4.5 to about 7.0, thereby forming an alumina hydrogel containing the calcium and magnesium in the form of a soluble complex with said acid, washing the hydrogel to remove said complex therefrom, and calcining the washed hydrogel to produce an alumina substantially free of calcium and magnesium.

References Cited in the file of this patent
UNITED STATES PATENTS

| | | |
|---|---|---|
| 1,337,192 | Buchner | Apr. 20, 1920 |
| 2,390,272 | Reismeyer et al. | Dec. 4, 1945 |

OTHER REFERENCES

Mehltretter et al.: "Industrial and Engineering Chemistry," volume 45, No. 12, December 1953, pages 2782 to 2784.

Chaberek et al.: "Organic Sequestering Agents," John Wiley and Sons, Inc., New York, 1959, pages 297, 298, 307, 315 to 324, 517.

Walton: "Scientific American," volume 188, No. 6, June 1953, pages 68 to 70, 72, 74 and 76.